United States Patent
Richter et al.

(10) Patent No.: US 8,898,901 B2
(45) Date of Patent: Dec. 2, 2014

(54) METHOD FOR MANUFACTURING A BLADE SPAR FOR A WIND TURBINE

(75) Inventors: Jed Richter, Cowes (GB); Toby Collard, Cowes (GB); Andrew Hedges, Southampton (GB); Arne Haahr, Ringkøbing (DK)

(73) Assignee: Vestas Wind Systems A/S, Aarhus N. (DE)

( * ) Notice: Subject to any disclaimer, the term of this patent is extended or adjusted under 35 U.S.C. 154(b) by 761 days.

(21) Appl. No.: 13/050,588

(22) Filed: Mar. 17, 2011

(65) Prior Publication Data

US 2011/0229336 A1   Sep. 22, 2011

Related U.S. Application Data

(60) Provisional application No. 61/316,031, filed on Mar. 22, 2010.

(30) Foreign Application Priority Data

Mar. 22, 2010   (EP) .................................... 10157211

(51) Int. Cl.
| | | |
|---|---|---|
| B21D 53/78 | (2006.01) | |
| B29C 70/30 | (2006.01) | |
| B29C 65/50 | (2006.01) | |
| B29C 65/60 | (2006.01) | |
| B29C 65/78 | (2006.01) | |
| B29C 65/00 | (2006.01) | |
| B29C 70/86 | (2006.01) | |
| F03D 1/06 | (2006.01) | |
| B29C 35/02 | (2006.01) | |
| B29C 65/48 | (2006.01) | |
| B29L 31/08 | (2006.01) | |

(52) U.S. Cl.
CPC ............ *B29C 70/30* (2013.01); *B29C 65/5014* (2013.01); *B29C 65/505* (2013.01); *B29C 65/5057* (2013.01); *B29C 65/601* (2013.01); *B29C 65/7832* (2013.01); *B29C 65/7855* (2013.01); *B29C 66/1122* (2013.01); *B29C 66/54* (2013.01); *B29C 66/721* (2013.01); *B29C 70/86* (2013.01); *F03D 1/0675* (2013.01); *B29C 35/02* (2013.01); *B29C 65/4835* (2013.01); *B29C 66/71* (2013.01); *B29C 66/7212* (2013.01); *B29L 2031/085* (2013.01); *Y02E 10/721* (2013.01); *F05B 2230/60* (2013.01); *F05B 2280/6003* (2013.01)
USPC ...................... 29/889.71; 416/226; 156/307.1; 156/92; 156/192; 156/293

(58) Field of Classification Search
USPC ....................... 29/889.71; 156/307.1; 416/226
See application file for complete search history.

(56) References Cited

U.S. PATENT DOCUMENTS

2011/0142679 A1 *   6/2011   Bendel et al. ............. 416/241 R

FOREIGN PATENT DOCUMENTS

| DE | 10 2008 037 367 A1 | 3/2009 |
|---|---|---|
| DE | 10 2008 055 513 A1 | 6/2009 |
| EP | 0 690 228 A1 | 1/1996 |
| WO | WO 2009109619 A2 * | 9/2009 |
| WO | 2009/156061 A2 | 12/2009 |

* cited by examiner

*Primary Examiner* — David Bryant
*Assistant Examiner* — Ruth G Hidalgo-Hernande
(74) *Attorney, Agent, or Firm* — Wood, Herron & Evans, LLP

(57) ABSTRACT

A method for manufacturing a blade spar for a wind turbine blade includes positioning a first spar segment having a first adhering portion; positioning a second spar segment having a second adhering portion at the first spar segment such that the first adhering portion and the second adhering portion are at least partially overlapping, wherein an adhesive is at least partially provided between the overlapping adhering portions; providing at least one fiber layer impregnated with an uncured resin on the outer surfaces of the first and second spar segments at least in the joint region of the first and second spar segments; and simultaneously curing the adhesive and the resin, thereby fixating the first and the second spar segments to each other.

19 Claims, 2 Drawing Sheets

METHOD FOR MANUFACTURING A BLADE SPAR FOR A WIND TURBINE

CROSS-REFERENCE TO RELATED APPLICATIONS

This application claims priority under 35 U.S.C. §119(a) to European Patent Application No. EP 10157211.3, filed Mar. 22, 2010. This application also claims the benefit of U.S. Provisional Application No. 61/316,031, filed Mar. 22, 2010. Each of the applications is incorporated by reference herein in its entirety.

TECHNICAL FIELD

The present invention relates to the manufacturing of a blade spar for a wind turbine blade, and, in particular, to the manufacturing of a spar having spar segments and to a rotor blade for a wind turbine having a spar manufactured in accordance with this method.

BACKGROUND

Typically, a rotor blade for a wind turbine is made of a spar and, for example, two blade halves connected to the spar. Nowadays, wind turbines have large blades (e.g., with a length of about 50 m or more) which are made of, for example, a composite material.

From DE 10 2008 037 367 A1 it is known to segment such large blades and to manufacture and to transport the blade segments separately. The blade segments are joined at the wind turbine site, for example. An inner spar segment of an inner blade segment can be inserted partially into an outer spar segment of an outer blade segment and the inner and outer spar segments are adhered to each other.

A similar method is known from DE 10 2008 055 513 A1. A grid structure is provided at a spar segment of a blade segment to be inserted into another spar segment of another blade segment in order to improve the distribution of an adhesive and thereby to improve the adhesion of spar segments to each other.

Moreover, from EP 0 690 228 B1 it is known to adhere a blade spar and two blade belts together and to reinforce the connection by means of overlapping outer fiber layers impregnated with resin. Alternatively, pre-cured belts can be positioned in a blade half and the blade spar is adhered to the pre-cured belts by the final curing of the blade half together with the pre-cured belts.

Another method for manufacturing a blade on the basis of two or more blade segments is known from WO 2009/156061 A2. During the manufacturing of a segmented wind turbine blade at least two of the blade segments are interconnected in an integration device. In the integration device, at least one web and at least one belt may be further connected to the blade segments. The segments, webs and belts may be produced from fiber layers and resin. In a first step, the segments, webs and belts are pre-cured, and after pre-curing, they are adhered to each other for interconnection. Consecutively, the interconnection is cured.

Embodiments in accordance with aspects of the invention provide an improved method for manufacturing a segmented blade spar.

SUMMARY

According to a first aspect, an embodiment provides a method for manufacturing a blade spar for a wind turbine blade. The method includes positioning a first spar segment having a first adhering portion; positioning a second spar segment having a second adhering portion at the first spar segment such that the first adhering portion and the second adhering portion are at least partially overlapping, wherein an adhesive is at least partially provided between the overlapping adhering portions; providing at least one fiber layer impregnated with an uncured resin on the outer surfaces of the first and second spar segments at least in the joint region of the first and second spar segments; and simultaneously curing the adhesive and the resin, thereby fixating the first and the second spar segments to each other.

According to a second aspect, an embodiment provides a rotor blade for a wind turbine comprising a spar which is at least partially manufactured in accordance with the method of the first aspect.

According to a third aspect, an embodiment provides a method for manufacturing a blade spar for a wind turbine blade. The method includes positioning a first spar segment having a first connection portion; positioning a second spar segment having a second connection portion at the first spar segment such that the first connection portion and the second connection portion are at least partially overlapping; providing a plurality of fixating elements extending at least partially through the thickness of the overlapping connection portions; providing at least one fiber layer impregnated with an uncured resin on the outer surfaces of the first and second spar segments at least in the joint region of the first and second spar segments; and curing the resin, thereby fixating the first and the second spar segments to each other.

Further aspects of embodiments according to the invention are set forth in the dependent claims, the following description and the drawings.

BRIEF DESCRIPTION OF THE DRAWINGS

Embodiments of the present invention are explained by way of example with respect to the accompanying drawings, in which.

DETAILED DESCRIPTION

Figure 1:
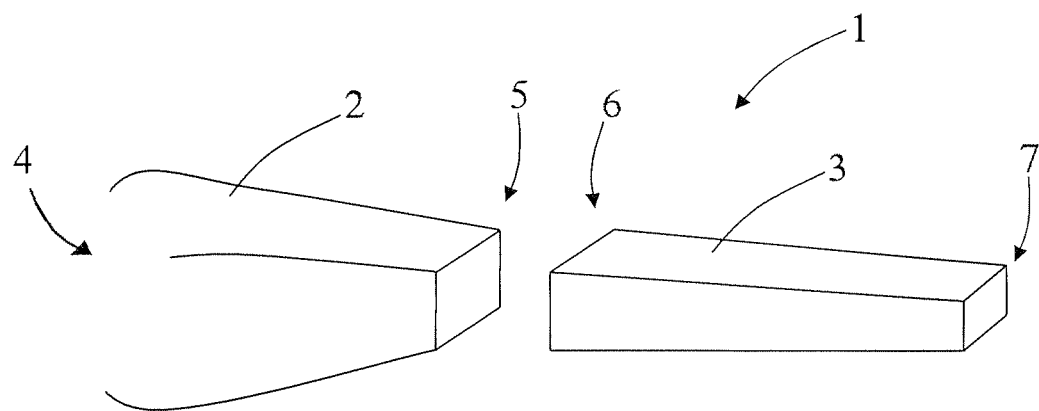
FIG. 1 schematically shows a blade spar segmented into a root spar segment and a tip spar segment.
Figure 2:
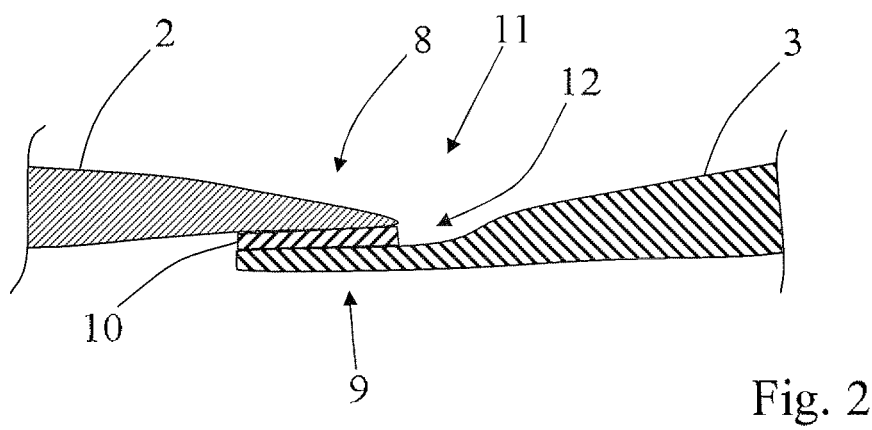
FIG. 2 schematically shows in a partial cross-sectional view of the tip spar segment partially inserted into the root spar segment with an adhesive layer therebetween in accordance with an embodiment of the present invention.
Figure 3:
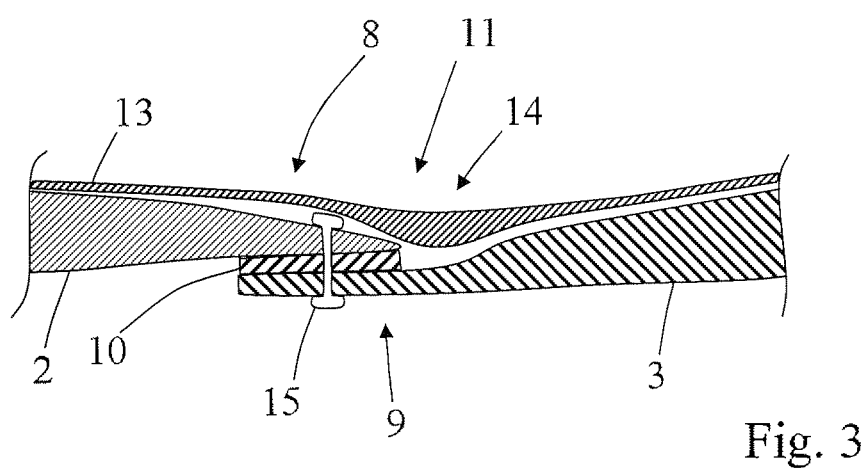
FIG. 3 illustrates in a partial cross-sectional view of the joint of the tip spar segment and the root spar segment of FIG. 2 covered with a fiber layer.

FIGS. 1-3 illustrate an embodiment of a blade spar 1 for a blade of a wind turbine, which is segmented into a root spar segment 2 and a blade spar segment 3, and the connection of these segments to each other in accordance with the present invention. Before proceeding further with a detailed description of the manufacturing method of the blade spar 1, however, a few general items will be discussed.

As mentioned in the outset, nowadays, wind turbines can have large blades of 50 meters and above, and, for example, from DE 10 2008 037 367 A1 it is known to segment such large blades and the blade spar along the longitudinal direction to simplify the manufacturing and transporting. The blade segments, together with the spar segments, can then be connected to each other at the erection site of the wind turbine.

Typically, wind turbine blades are made of a composite material comprising fibers, such as carbon and/or glass fibers, and a resin, such as an epoxy resin. The blades can be made, for example, of two blade halves in the embodiments, one for the pressure side and one for the suction side of the blade. For manufacturing of the blade halves, for example, fiber layers comprising carbon or glass fibers which are impregnated with a resin, such as a polymer or epoxy resin, are laminated and cured in respective blade molds or blade mold segments in the case of segmented blades.

A blade spar is provided in the middle of the blade as a structural part receiving the shear and torsion forces acting on the wind turbine blade during operation. Blade spars can be manufactured, for example, by providing respective structural parts in a blade halve, which is, for example, manufactured in a mold, such as described in WO 2009/156061 A2 and EP 0 690 228 B1, mentioned in the outset.

The spar or spar segments can also be pre-manufactured, for example, by adhering or mounting respective belt and web parts together. It is also known, for example, to wind a winding material made of fibers, such as carbon or glass fibers, around a winding mold or core to manufacture a wound spar or spar segments, such as described in EP 0 690 228 B1, mentioned in the outset.

As wind turbine blades are prone to high shear and tension forces during operation, the connection of the blade segments, and, in particular, the connection of the spar segments to each other must withstand such high forces.

From DE 10 2008 037 367 A1, mentioned in the outset, it is known to connect an inner spar segment to an outer spar segment by inserting the inner spar segment partially into an outer spar segment and to adhere them to each other with an adhesive. DE 10 2008 055 513 A1, also mentioned in the outset, criticizes that such an adhering of spar segments to each other is problematic, since the adhesive is not uniformly distributed and, thus, it suggests to provide a specific grid on the inserted spar segment in order to improve the adhesive distribution.

However, it has been recognized by the inventor that the connection of spar segments to each other can be improved by using two types of connection. The spar segments are adhered together inside the spar segments and, additionally, at least one fiber layer is provided outside at the joint of the spar segments. Moreover, the inventor also recognized that a strong connection of the spar segments can be provided when the adhesive and the resin with which the fiber layer is impregnated are cured simultaneously and that the time needed for manufacturing of the spar can be shortened.

In the embodiments, a method for manufacturing a blade spar for a wind turbine includes the steps of providing and positioning a first spar segment with a first adhering portion and a second spar segment with a second adhering portion. The second spar segment is positioned at the first spar segment such that the first and second adhering portions are at least partially overlapping. An adhesive is positioned between the overlapping adhering portions in order to adhere the first and second spar segments to each other in a later curing step.

In some embodiments, the spar may include more than two spar segments, but at least two spar segments are connected to each other with the method for manufacturing a blade spar, as described herein. The spar can be segmented in the longitudinal direction and/or perpendicular to the longitudinal direction. The spar segments are pre-manufactured in some embodiments and can be made of a composite material, as already mentioned above.

The first and second adhering portions overlap such that a gap for the adhesive is formed between the first and second adhering portions. The adhesive can be provided on the first and/or second adhering portion before the second spar segment is positioned at the first spar segment. For example, an adhesive layer, such as a prepreg layer, can be wrapped around the adhering portion of the second spar segment. In the case that the adhesive is provided before the second spar segment is positioned at the first spar segment, the gap is already filled with the adhesive when the second spar segment is positioned at the first spar segment.

In some embodiments, the adhesive is provided after the second spar segment is positioned at the first spar segment. In such embodiments, for example, the adhesive can be infused into the gap after the second spar segment has been positioned at the first spar element. In still other embodiments, adhesive is provided before and after positioning the second spar element at the first spar element. In some embodiments, the adhesive does not comprise any fibers. In some embodiments, the adhesive is provided pointwise at the first and/or second adhering portions.

The adhering portions can have any shape which is suitable for being adhered to each other. In some embodiments, at least one surface section of the adhering portion of the first spar segment matches to at least one surface section of the adhering portion of the second spar segment, i.e., the adhering portions and their adhering surfaces, respectively, have a similar or identical shape. In some embodiments, the adhering portions have a structured surface which is suitable to receive an adhesive in order to provide a uniform distribution of adhesive in the gap between the overlapping adhering portions.

The adhering portion(s) can be formed integral with the spar segment and/or it can be provided as a separate element, which is, for example, mounted to the spar segments before or after positioning the second spar segment at the first spar segment.

In some embodiments, the spar segments have a cylindrical or conical shape with a circular, elliptical, rectangular, etc., cross section. The shapes of the spar segments can also differ, for example, in dependence on their position within the blade. For example, in some embodiments the first spar segment is a root spar segment which extends from the blade root outwardly, i.e., towards the tip of the blade, and the second spar segment is a tip spar segment, extending from the root spar segment to the blade tip. In some embodiments, the root spar element can have, for example, a round shape which is substantially circular and/or elliptical, while the tip spar segment is, for example, substantially rectangular. Of course, mixtures of different shapes are also realized. For example, the root spar element can have a section with a substantially circular cross section at the blade root position. From this circular section the shape changes to an elliptical cross section and then to a substantially rectangular cross section in the direction to the blade tip.

The first spar segment and/or the second spar segment include in some embodiments a composite material, such as carbon fibers, glass fibers, or a mixture of them, and a resin, such as an epoxy resin. The spar segments can be pre-formed, for example, by winding a winding material around a core or similar structure and/or by mounting/adhering respective spar parts, for example, web and belt parts together, as is known to the skilled person.

In some embodiments, the first spar segment is at least partially hollow and it partially receives an end section of the second spar segment when the second spar segment is positioned at the first spar segment. In some embodiments in which the spar is segmented along the longitudinal direction, the second spar segment can be telescopically inserted into the cavity of the first spar segment, or vice versa, i.e., the first spar segment can also be inserted into a cavity of the second spar segment. In some embodiments, the cross sections of the portions of the first and second spar segments which are telescopically inserted into each other, such as the adhering portions, have an identical or at least similar cross-sectional shape, such that the gap between the overlapping sections (adhering portions) of the first and second segments is substantially uniform. Additionally, the first and second spar segment can each have a conical shape.

In such embodiments, in which the second spar segment is partially inserted into the first spar segment in a telescopic manner (or vice versa), the first adhering portion of the first spar segment is provided by the inner surface of the cavity which is adjacent to the outer surface of the received second spar segment, which thus provides the second adhering portion of the second spar segment. Hence, a gap, which is filled with adhesive, is formed between the outer surface of the inserted second spar segment and the overlapping inner surface of the first spar segment which partially received the second spar segment.

Next, at least one fiber layer, including, for example, a winding material and/or at least one slab made of a fiber, such as carbon or glass fiber, which is impregnated with an uncured resin, is provided on the outer surfaces of the first and second spar segments at least in the joint region. The resin includes, for example, an epoxy resin. The fiber layer can also include at least one prepreg. The fiber layer can be impregnated with the resin before it is provided on the outer surfaces or after it is provided on the outer surfaces. For example, dry fibers can be positioned on the outer surfaces of the first and second spar segments and the dry fibers can then be impregnated with a resin infusion method, for example.

The joint region is formed by the overlapping adhering portions and, in particular, the joint region comprises at least one edge of the first spar segment, for example, of the first adhering portion, overlapping the second spar segment or the second adhering portion, respectively. The edge forms a kind of step in the joint region.

In some embodiments, the joint region extends around the periphery of the first and second spar segments and the fiber layer is provided by winding the winding material and/or the at least one slab around the first and second spar segments, at least in the joint region.

The adhesive between the overlapping adhering portions and the resin of the at least one fiber layer are simultaneously cured. Hence, the first and the second spar segments are fixated to each other in at least two regions, namely in the region of the first and second adhering portions by the cured adhesive, and on the outer surfaces of the first and second spar segments in the region where the at least one overlaying fiber layer impregnated with resin is cured and adhered to the outer surfaces.

Thereby, a strong adhesion between the first and second spar segments with a long lifetime is provided. Additionally, this kind of binding provides a high security, since the adhesive, as well as the at least one fiber layer, are receiving the operational loads of the blade and the spar. As the curing of the adhesive and the resin is performed simultaneously, the manufacturing is time saving and the spar production is optimized.

In some embodiments, the first and second spar segments are temporarily fixated to each other with at least one fixating element before the at least one fiber layer is provided. For example, the spar segments can be fixated by supporting structures which support the first and second spar segments in the joint region.

As mentioned above, in some embodiments a blade spar has a length of 50 meters and more, for example, in the case of two spar segments, each will have a length of about 25 meters. The spar segments, which can be made of a composite material, are typically flexible in some embodiments and thus, tend to self-loaded deformation. In some embodiments, the fiber layer which is provided at the joint region extends about several meters in either longitudinal direction of the two spar segments and it is wound around the joint region. Hence, in this case a support structure supporting the spar segments in the joint region might hinder the application of the at least one fiber layer in the joint region. Therefore, in some embodiments, the spar segments are not supported in the region where the fiber layer is provided. In order to avoid a dislocation of the spar segments, for example, by self-loaded deformation, after the second spar segment has been positioned at the first spar segment, and a cracking of the composite material in the joint region, multiple fixating elements are provided at the overlapping adhering portions. In some embodiments, the fixating elements, such as rivets, screws, nails or the like, extend through the thickness of the overlapping adhering portions, thereby fixating the first and second spar segments to each other. Thus, by temporarily fixating the first and second spar elements to each other, for example, a curing of the adhesive between the overlapping adhering portions can be omitted before the fiber layer is provided in the case of large spar segments tending to self-loaded deformation. The fixating elements are not removed in some embodiments. The temporarily fixating refers to the time until the first and second spar segments are fixated to each other by the cured adhesive and the cured fiber layer. As the fixating elements are not removed, they also fixate the first and second spar segments to each other after curing.

In some embodiments, before curing the resin and adhesive, a vacuum bag is provided enclosing at least the region of the at least one fiber layer. Applying a vacuum presses the at least one fiber layer onto the surface of the spar segments and thereby, the at least one fiber layer is fixated to the spar segments. After the vacuum is applied in the bag, the curing is performed.

The curing step comprises in some embodiments the heating at a temperature of above 100° C. In some embodiments, the curing step comprises heating at a temperature of about 120° C. The heating is performed, for example, by blowing hot air produced by a blower and a heater through the spar segments which are hollow in some embodiments. Moreover, heat can also be applied from outside of the spar segments onto the joint region and the fiber layer, for example, by hot air, heating mats, radiant heater, oven, or the like. In some embodiments, the heating lasts for about three hours for curing the adhesive and the at least one fiber layer. The temperature, and in particular the heating time depends on the used composite material, the resin, and the thicknesses of the adhesive between the overlapping adhering portions and the at least one fiber layer.

In some embodiments, the first adhering portion of the first spar segment and/or the second adhering portion of the second spar segment are tapered. By tapering the adhering portions, the final thickness of the joint region can be reduced and, for example, the insertion of the second spar segment into the first spar segment can be simplified in some embodiments due to the tapered shape of the inserted end section of the second spar segment. In some embodiments, the tapering of the adhering portion(s) is performed during the manufacturing of the spar segments. In other embodiments, the tapering is provided after the manufacturing of the spar segments or it is performed during and after manufacturing of the spar.

The at least one fiber layer can be formed thicker in the joint region of the overlapping adhering portions than outside the joint region such that a thicker region is provided in the joint region. By applying a thicker fiber layer or more fiber layers in the joint region, for example, the missing material at the tapered adhering portions can be compensated. Moreover, in the joint region there is a step at the joint of the first and second spar segments due to the overlapping of the adhering portions, as mentioned above. By varying the thickness of the fiber layer the step can be compensated and the outer surface of the joined spar segments can be smoothed in the joint region.

As mentioned, in some embodiments the first and second blade spar segments are fixated with a plurality of fixating elements to each other in the region of the overlapping first and second adhering portions. In such embodiments, the adhering of the adhering portions to each other and thus, also the adhesive between the overlapping adhering portions, might be omitted or the adhesive between the first and second adhering portions might be cured independently from the curing of the fiber layer. Thus, in such embodiments, the method for manufacturing a blade spar for a wind turbine blade includes positioning a first spar segment having a first connection portion; positioning a second spar segment having a second connection portion at the first spar segment, such that the first connection portion and the second connection portion are at least partially overlapping; providing a plurality of fixating elements, such as rivets, pins, screws or the like, extending at least partially through the thickness of the overlapping connection portions; providing at least one fiber layer impregnated with an uncured resin on the outer surfaces of the first and second spar segments at least in the joint region of the first and second spar segments; and curing the resin, thereby fixating the first and the second spar segments to each other. In such embodiments, the first and second adhering portion of the first and second spar segment, respectively, is referred to as first and second connection portion, since in such embodiments, the adhesive between the adhering, i.e., connection portions, can be omitted. The description of the adhesive portions herein also applies on the connection portions of such embodiments. Also, the description of the fixating of the first and second spar segments to each other by the fixating elements, and the description of the identical method steps applies on such embodiments.

Some embodiments refer to a rotor blade for a wind turbine including a spar which is at least partially manufactured in accordance with the method explained above. Some embodiments refer to a wind turbine with at least one such rotor blade. The wind turbine typically comprises a nacelle, a rotor with one, two, three or more rotor blades and a tower, and elements for converting the wind energy into electrical energy, as known to the person skilled in the art.

Figure 4:
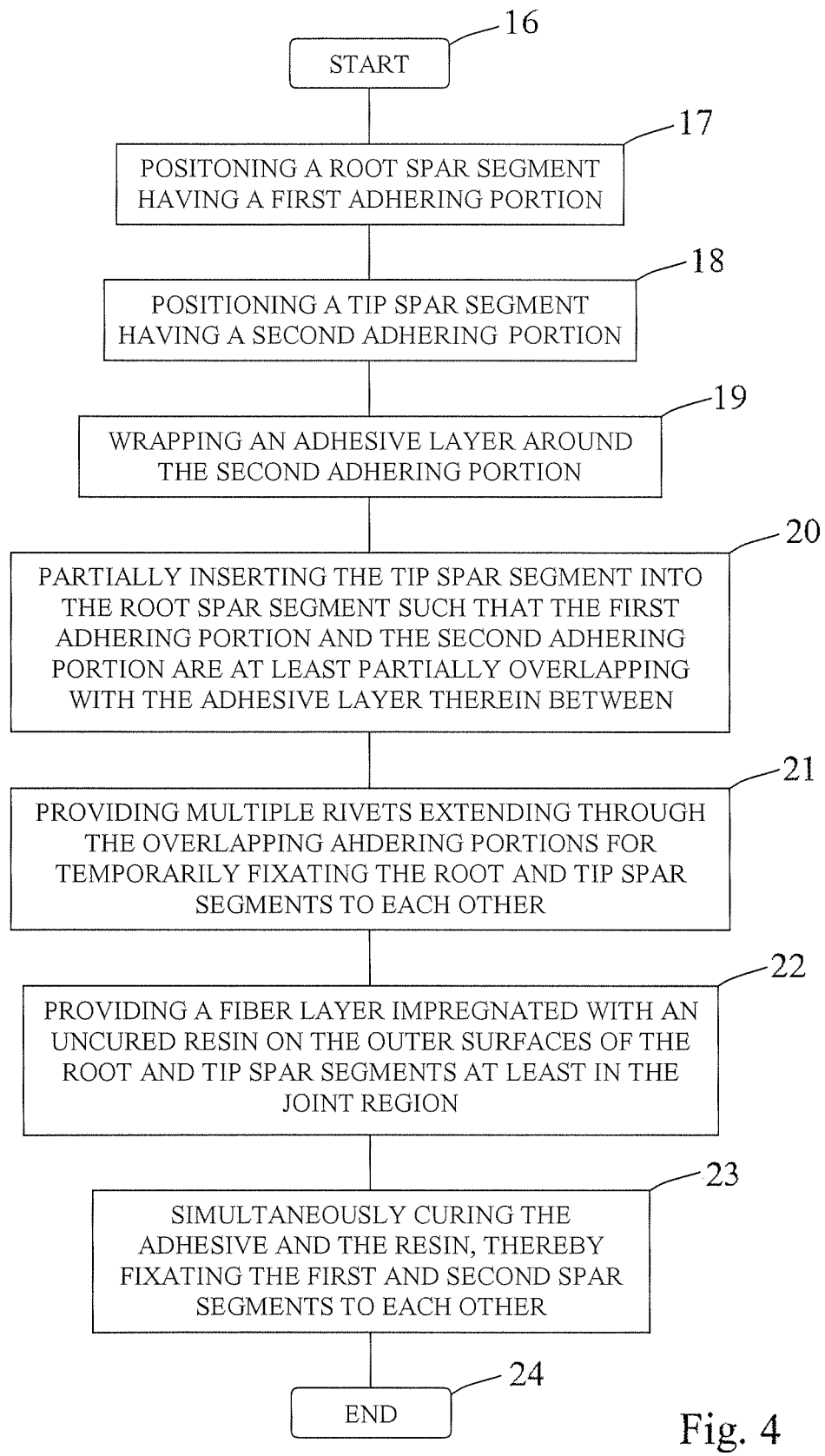
FIG. 4 shows a flow chart of a method for manufacturing the joint of the tip spar and root spar segment of FIGS. 1-3 in accordance with aspects of the invention.

Returning to FIGS. 1-3, there is illustrated an embodiment of a spar 1 for a wind turbine blade, which is formed by joining a root spar segment 2 and a tip spar segment 3 in accordance with a manufacturing method including the steps shown in a flow chart in FIG. 4. The manufacturing method of the spar 1 starts at a step 16 (FIG. 4). At 17, the pre-manufactured root spar segment 2 with a first adhering portion 8 is positioned, and at step 18, the pre-manufactured tip spar segment 3 with a second adhering portion 9 is positioned, for example, on respective support structures (not shown). The root spar segment 2 and the tip spar segment 3 each comprise a composite material.

The root spar segment 2 has a root end 4 which will be positioned at a blade root when the spar is integrated into the wind turbine blade. On the other end opposite to the root end 4, the root spar segment 2 has a tip end 5. The root spar segment 2 is hollow and has substantially a circular cross section in the region of the root end 4, while the cross section in the region of the tip end 5 is basically rectangular, such that, for example, blade halves can be connected to the root spar segment 2. Moreover, the root spar segment 2 has a conical shape, i.e. its diameter is larger at the root end 4 than at the tip end 5.

The tip spar segment 3 has a root end 6 and a tip end 7. The tip spar segment 3 will be inserted with the root end 6 telescopically received into the hollow tip end 5 of the root spar segment 2. The tip end 7 of the tip spar segment 3 will be at the blade tip end when the blade spar 1 is integrated into the wind turbine blade. Also, the tip spar segment 3 has a conical shape and its diameter is larger at the root end 6 than at the tip end 7. The tip spar segment 3 has a rectangular cross section which is similar to, but smaller than the cross section of the root spar segment 2 at its tip end 5, such that the tip spar segment 3 can be telescopically inserted into the root spar segment 2 at the tip end 5 of the root spar segment 2.

In alternative embodiments, as mentioned above, the root end 6 of the tip spar segment 3 is inserted into the tip end 5 of the root spar segment 2.

The root spar segment 2 is made of a composite material including basically glass fibers and a resin in the root end 4 region and it is made by winding the composite material around a core. The tip spar segment 3 is made of a composite material including a mixture of carbon and glass fibers and a resin. The mixtures of the root spar segment 2 and the tip spar segment 3 are different due to the different kind of loads acting on them during operation of the wind turbine. The root spar segment 2 is mounted with the root end 4 at a rotor of a wind turbine and thus, has to carry the total weight of the rotor blade, while the tip spar segment 3 is positioned outwardly of the rotor blade and is exposed, for example, to bending and shear loads. By varying the amount of carbon and glass fibers in the composite material, the mechanical characteristic of the composite material can be varied, since carbon fibers provide more flexibility than, for example, glass fibers, as it is known to the skilled person.

The root spar segment 2 has a first adhering portion 8 (FIGS. 2 and 3) at the tip end 5, and the tip spar segment 3 has a second adhering portion 9 at its root end 6. In this embodiment, the first 8 and second 9 adhering portions are integral with the root 2 and the tip 3 spar segments, respectively, and extend around the periphery of the tip end 5 and the root end 6, respectively.

As mentioned above, in some embodiments, in which the adhesive between the overlapping first and second adhering portions might also be omitted, the first and second adhering portion are referred to as first and second connection portions, respectively. Beneath that difference, the description of the present embodiment also applies on such embodiments, where the first and second segments are attached to each other with the fixating elements 15.

Moreover, the first and second adhering portions 8, 9 are tapered (see FIGS. 2 and 3). The first adhering portion 8 of the root spar segment 2 is inclined on the outer surface such that the composite material thickness decreases in the direction towards the tip end 5. Similarly, the second adhering portion 9 is inclined at the outer surface such that the composite material thickness decreases in the direction towards the root end 6. The tapering simplifies the insertion of the root end 6 of the tip spar segment 3 into the tip end 5 of the root spar segment 2 and the height of a step 12 is reduced compared to an un-tapered tip end 5 of the root spar segment 2.

At a step 19, an adhesive layer 10 (FIGS. 2 and 3) is wrapped around the outer surface of the tip spar segment 3 at the second adhering portion 9. The adhesive layer 10 is made of a composite material, such as a prepreg, comprising, for example, a mixture of carbon and glass fibers and an epoxy resin. The adhesive layer 10 has a thickness of about 1 mm and has a substantially solid consistence. Due to the solid character, the adhesive layer 10 can be wrapped around the second adhering portion 9 and it sticks to the adhering portion 9 due the epoxy resin.

Next, at step 20, the tip spar segment 2 is partially inserted with the root end 6 into the hollow tip end 5 of the root spar segment 2, such that the first adhering portion 8 partially overlaps the second adhering portion 9 together with the adhesive layer 10. The overlapping area of the adhering portions 8, 9 in this embodiment extends about 400 mm in the longitudinal direction, i.e., in the longitudinal direction of both the tip end 5 and the root end 6. The width of the adhesive layer 10 is adapted to the overlapping area of the adhering portions 8, 9 and thus, is also about 400 mm. The adhesive layer 10 is located between the inner surface of the root spar segment 2 in the region of the first adhering portion 8 and the outer surface of the tip spar segment 3 in the region of the second adhering portion 9 and thus, is in contact with the respective inner and outer surfaces of the composite material. These inner and outer surfaces of the first and second adhering portions 8, 9 contacting the adhesive layer 10 are substantially flat such that a uniform gap is provided between the overlapping adhering portions 8, 9, which is filled by the adhesive layer 10.

Next, at step 21, a plurality of rivets 15 are provided, which extend through the thickness of the first adhering portion 8, the adhesive layer 10 and the second adhering portion 9. The rivets 15 are uniformly distributed around the periphery of the tip end 5 of the root spar segment 2. Before inserting and fixing the rivets 15, through holes are drilled through the first and second adhering portions 8, 9 as well as through the adhesive layer 10. The rivets 15 temporarily fixate the root spar segment 2 and tip spar segment 3 to each other, since otherwise the root and tip spar segments 2, 3 tend to misalign due to self-loaded deformation and to their lengths which might also tend to the formation of cracks in the composite material of the root and/or tip spar segments. The bending of the root and/or tip spar segments 2, 3, in particular in the tip end 5 and root end 6 region, can be avoided, for example, by supporting the root and tip spar segments 2, 3 with a support structure (not shown) in these regions before fixing them together with rivets 15. The support structure can be removed after having fixed the root spar segment 2 and the tip spar segment 3 to each other by the plurality of rivets 15, such that the support structure no longer hinders the application of a fiber layer 13.

Next, at step 22, a fiber layer 13 is wrapped around the joint region 11. The fiber layer 13 is made of a composite material, such as prepregs, including a winding material and slabs made of a mixture of carbon and glass fibers, which are impregnated with an uncured epoxy resin. The joint region 11 is the region where the step 12 is formed by the edge of the tip end 5 of the root spar segment 2 and the adhesive layer 10. In the present embodiment, the fiber layer 13 extends about six meters in the longitudinal direction of the spar 1, i.e., about three meters on the left and right side from the joint region 11 and has an average thickness of about 25 mm. The fiber layer 13 does not only comprise one layer of fibers, but it is made of a plurality of fibers and slabs made of fibers such that it forms the average thickness of about 25 mm.

Moreover, the fiber layer 13 is such formed that its thickness in the joint region 11 is larger than outside the joint region 11, thereby providing a thicker portion 14 in the joint region 11 in order to compensate for the tapering of the first and second adhering portions 8, 9 and hence, for the reduced composite material thickness in the adhering portions 8, 9 of the composite material of the root and tip spar segments 2, 3 and the adhesive layer 10 (compared to the thickness outside these portions). Furthermore, the transition from the tip spar segment 3 to the root spar segment 2 with the intermediate step 12 is smoothed by the fiber layer 13. The thickness variation of the thicker portion 14 of fiber layer 13 is adapted to the shape of the transition area.

In some embodiments, the root spar segment 2 comprises slits in the region of the tip end 5 running in the longitudinal direction of the root spar segment 2 in order to provide flexible portions within the first adhering portion 8 which can be pressed against the adhesive layer 10. In order to avoid cracks in the end region of the slits, for example, holes are drilled into the composite material at the closed end of each slit.

Before performing the curing, the root spar segment 2 and the tip spar segment 3 are enclosed by a vacuum bag (not shown) in the region of the fiber layer 13, and a vacuum is applied. The air pressure presses on the vacuum bag and, thus, also on the fiber layer 13 surrounding the joint region 11. Due to the slits in the region of the tip end 5 of the root spar segment 2, the flexible portions within the first adhering portion 8 press against the adhesive layer 10 to ensure a good contact between adhesive layer 10 and the inner surface of the first adhering portion 8 and the outer surface of the second adhering portions 9.

Next, at a step 23, the fiber layer 13 and the adhesive layer 10 are cured simultaneously. The curing is performed at a temperature of about 120° C. by blowing hot air through the hollow root spar segment 2 and tip spar segment 3, which thus also passes the joint region 11. The hot air heats the root spar segment 2 and the tip spar segment 3 and thereby also the adhesive layer 10 which is cured. Moreover, heat is applied from outside onto the root and tip spar segments 2, 3, for example, by a hot air blower (or oven) applying heat onto the fiber layer 13 and thereby heating the fiber layer 13. Hence, the adhesive layer 10 and the fiber layer 13 are cured simultaneously.

The curing takes about three hours and after the curing step 23, the manufacturing method ends at 24.

In the present embodiment, the wrapping of the adhesive layer 10 as well as the mounting of the rivets 15 each takes about 10 minutes. The wrapping of the fiber layer 13 takes about half an hour and, as mentioned, the curing takes about three hours. As the rivets 15 are provided for fixating the root spar segment 2 and the tip spar segment 3 together, there is no need, for example, to cure the adhesive layer 10 before the fiber layer 13 is provided to fixate the root and tip spar segments 2, 3 to each other, thereby saving the time which would be needed for curing the adhesive layer 10. As mentioned above, in particular, long blade spar segments tend to self-loaded deformation and thus, a fixation is needed at the joint region 11 before the fiber layer 13 is provided in order to ensure that the root and tip spar segments 2, 3 are well aligned to each other and that the composite material does not crack in the joint region 11 due to self-loaded deformation.

In other embodiments, other fixating element may be used, such as screws, pins or any other suitable fixating element which can provide a temporarily fixation of respective spar segments to each other.

While the invention has been illustrated by a description of various embodiments, and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative methods, and illustrative examples shown and described. Accordingly, departures may be made from such details without departing from the spirit or scope of the general inventive concept.

What is claimed is:

1. A method for manufacturing a blade spar for a wind turbine blade, comprising:
    positioning a first spar segment having a first adhering portion;
    positioning a second spar segment having a second adhering portion at the first spar segment such that the first adhering portion and the second adhering portion are at least partially overlapping, wherein an adhesive is at least partially provided between the overlapping adhering portions;
    providing at least one fiber layer impregnated with an uncured resin on the outer surfaces of the first and second spar segments at least in the joint region of the first and second spar segments; and
    simultaneously curing the adhesive and the resin, thereby fixating the first and the second spar segments to each other.

2. The method according to claim 1, further comprising fixating the first spar segment and the second spar segment to each other with at least one fixating element before the at least one fiber layer is provided.

3. The method according to claim 1, wherein the curing step comprises the step of heating at a temperature of above 100° C.

4. The method according to claim 1, further comprising, before performing the curing step, applying a vacuum at least in the region of the at least one fiber layer.

5. The method according to claim 1, wherein the adhesive comprises a prepreg layer.

6. The method according to claim 1, further comprising at least partially tapering the adhering portion of the first spar segment and/or the adhering portion of the second spar element.

7. The method according to claim 1, wherein the step of providing the at least one fiber layer further comprises forming the fiber layer with a thicker portion in the joint region of the overlapping adhering portions than outside the joint region.

8. The method according to claim 1, wherein a root end of the second spar segment is partially inserted into a tip end of the first spar segment such that the adhering portions are overlapping.

9. The method according to claim 1, further comprising pre-manufacturing the first and/or second spar segments with a composite material and curing it.

10. A rotor blade for a wind turbine, comprising a spar manufactured in accordance with the method of claim 1.

11. The method according to claim 1, wherein the at least one fiber layer extends along substantially the entire joint region of the first and second spar segments.

12. The method according to claim 2, wherein the at least one fixating element extends through the thickness of the overlapping adhering portions.

13. The method according to claim 12, wherein the at least one fixating element comprises a rivet.

14. The method according to claim 3, wherein the curing step comprises the step of heating at a temperature of about 120° C.

15. The method according to claim 3, wherein the curing step comprises the step of heating for approximately three hours.

16. The method according to claim 5, further comprising wrapping the prepreg layer around the second adhering portion.

17. A method for manufacturing a blade spar for a wind turbine blade, comprising:
    positioning a first spar segment having a first connection portion;
    positioning a second spar segment having a second connection portion at the first spar segment such that the first connection portion and the second connection portion are at least partially overlapping;
    providing a plurality of fixating elements extending at least partially through the thickness of the overlapping connection portions;
    providing at least one fiber layer impregnated with an uncured resin on the outer surfaces of the first and second spar segments at least in the joint region of the first and second spar segments; and
    curing the resin, thereby fixating the first and the second spar segments to each other.

18. The method according to claim 17, further comprising providing an adhesive between the overlapping connection portions.

19. The method according to claim 17, wherein the at least one fiber layer extends along substantially the entire joint region of the first and second spar segments.

* * * * *